(12) United States Patent
Troeger et al.

(10) Patent No.: US 9,477,921 B2
(45) Date of Patent: Oct. 25, 2016

(54) ELECTRICAL CONNECTOR HOUSING HAVING AN RFID TRANSPONDER

(71) Applicant: HARTING ELECTRIC GMBH & CO. KG, Espelkamp (DE)

(72) Inventors: Lutz Troeger, Osnabrueck (DE); Dirk Schmieding, Bad Essen (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 0 days.

(21) Appl. No.: 14/420,605

(22) PCT Filed: Jul. 16, 2013

(86) PCT No.: PCT/DE2013/100263
§ 371 (c)(1),
(2) Date: Feb. 9, 2015

(87) PCT Pub. No.: WO2014/023296
PCT Pub. Date: Feb. 13, 2014

(65) Prior Publication Data
US 2015/0199603 A1    Jul. 16, 2015

(30) Foreign Application Priority Data

Aug. 8, 2012   (DE) ........................ 10 2012 107 270

(51) Int. Cl.
*G06K 19/06*      (2006.01)
*G06K 19/077*     (2006.01)
*H01Q 1/22*       (2006.01)
(Continued)

(52) U.S. Cl.
CPC ... *G06K 19/07758* (2013.01); *G06K 19/07756* (2013.01); *G06K 19/07773* (2013.01); *H01Q 1/2225* (2013.01); *H01Q 13/10* (2013.01); *H01R 13/465* (2013.01); *H01R 13/6691* (2013.01)

(58) Field of Classification Search
CPC ................. G06K 19/07758; G06K 19/07756; G06K 19/07773; H01Q 1/2225; H01Q 13/10; H01Q 13/465; H01Q 13/6691
USPC .................................................. 235/487, 492
See application file for complete search history.

(56) References Cited

U.S. PATENT DOCUMENTS 6,384,794 B1   5/2002  Huang
7,580,000 B2   8/2009  Kai et al.
(Continued)

FOREIGN PATENT DOCUMENTS

DE    10244304 B3    3/2004
DE    10249414 A1    5/2004
(Continued)

OTHER PUBLICATIONS

International Search Report issued in corresponding application No. PCT/DE2013/100263 (6 pgs).

*Primary Examiner* — Paultep Savusdiphol
(74) *Attorney, Agent, or Firm* — Hayes Soloway, P.C.

(57) ABSTRACT

A disadvantage of the prior art consists in the fact that the RFID transponders attached to plug-in connectors have a range that is insufficient for many applications. The present disclosure provides a design for a plug-in connector housing with an RFID transponder integrated therein, which allows a range that is greater than the one possible in the prior art. This object is achieved as a result of the fact that the antenna of the RFID transponder includes a slot, so that the antenna is a slot antenna.

14 Claims, 3 Drawing Sheets

(51) Int. Cl.
*H01Q 13/10* (2006.01)
*H01R 13/46* (2006.01)
*H01R 13/66* (2006.01)

(56) References Cited

U.S. PATENT DOCUMENTS

| | | | |
|---|---|---|---|
| 7,963,705 B2 | 6/2011 | Staeber et al. | |
| 8,262,406 B2 | 9/2012 | Lindkamp | 439/470 |
| 2004/0052471 A1 | 3/2004 | Colombo et al. | 385/53 |
| 2006/0049942 A1 | 3/2006 | Sakama et al. | 340/572.1 |
| 2006/0148279 A1 | 7/2006 | German et al. | |
| 2006/0190538 A1* | 8/2006 | Hwang | H04L 12/2809 709/204 |
| 2006/0250250 A1 | 11/2006 | Youn | |
| 2008/0136716 A1 | 6/2008 | Annamaa et al. | |
| 2008/0309495 A1 | 12/2008 | Chisholm | 340/572.7 |
| 2009/0032577 A1* | 2/2009 | Aguren | G02B 6/3895 235/375 |
| 2010/0052859 A1 | 3/2010 | Lossau | |
| 2010/0080554 A1* | 4/2010 | Aguren | H04B 10/073 398/20 |
| 2010/0188306 A1 | 7/2010 | Kitayoshi et al. | |
| 2010/0270382 A1 | 10/2010 | Koepp et al. | |
| 2010/0306033 A1* | 12/2010 | Oved | G06Q 10/06375 705/7.37 |
| 2011/0043413 A1 | 2/2011 | Zadesky et al. | |
| 2011/0047188 A1* | 2/2011 | Martins | G06K 19/07749 707/803 |
| 2011/0274437 A1* | 11/2011 | Jones | G02B 6/3895 398/141 |
| 2011/0315757 A1* | 12/2011 | Colman | B01L 3/565 235/375 |
| 2012/0109798 A1* | 5/2012 | Shelton | B60L 3/0069 705/34 |
| 2012/0168521 A1* | 7/2012 | Jones | G02B 6/3895 235/492 |
| 2012/0306661 A1* | 12/2012 | Xue | G05B 19/042 340/870.02 |
| 2013/0154808 A1* | 6/2013 | Han | H01R 13/465 340/10.5 |
| 2013/0183851 A1* | 7/2013 | Takakura | H01R 13/465 439/490 |
| 2013/0240633 A1 | 9/2013 | Hehlgans | |

FOREIGN PATENT DOCUMENTS

| | | | |
|---|---|---|---|
| DE | 102004060510 A1 | 7/2006 | |
| DE | 202006008817 U1 | 8/2006 | |
| DE | 202008001548 | 5/2008 | H01Q 1/22 |
| DE | 202008001548 U1 | 5/2008 | |
| DE | 202008001549 | 5/2008 | H01Q 1/22 |
| DE | 202008001549 U1 | 5/2008 | |
| DE | 202007018305 U1 | 6/2008 | |
| DE | 202007018307 U1 | 6/2008 | |
| DE | 102005022281 B4 | 4/2009 | |
| DE | 102009053364 | 1/2011 | H01R 13/58 |
| DE | 202010013072 U1 | 3/2011 | |
| EP | 2182471 A1 | 5/2010 | |
| JP | 200337861 A | 2/2003 | |
| JP | 200949655 A | 3/2009 | |
| WO | 2009/088684 A1 | 7/2009 | |

* cited by examiner

ELECTRICAL CONNECTOR HOUSING HAVING AN RFID TRANSPONDER

The invention relates to a plug-in connector housing according to the preamble of independent claim 1.

RFID (Radio Frequency Identification Device) transponders are used for the most varied applications, for example for the electronic identification of articles.

PRIOR ART

It has already been proposed in the prior art to equip a plug-in connector with an RFID transponder, for example for coding purposes.

Thus, document DE102009053364B3 discloses a plug-in connector housing which, in an advantageous embodiment, includes a coding element. This coding element is colour-coded and/or equipped with an RFID transponder.

Further, document DE202008001549U1 discloses an RFID transponder having a slot antenna in different embodiments.

One disadvantage in the prior art consists in the fact that the RFID transponders known from the prior art, which are attached to plug-in connectors, have a range that is insufficient for many applications.

OBJECT OF THE INVENTION

It is therefore the object of the present invention to provide a design for a plug-in connector housing having an RFID transponder integrated therein, which housing allows a range that is greater than the one provided in the prior art.

This object is achieved with a plug-in connector housing of the type mentioned above by means of the features of the characterising part of independent patent claim 1.

The invention relates to a plug-in connector housing with an integrated RFID transponder that can for example be read using a mobile hand-held RFID reader even from distances of several meters.

Advantageous embodiments of the invention are indicated in dependent sub-claims 2-12.

One advantage of the invention consists in the fact that the RFID transponder of the plug-in connector housing can be read using an RFID reader over a distance of several meters. As a result, so-called "bulk" reading, i.e. reading of entire cable strands and plug-in connector pools, from a corresponding distance becomes possible.

In an advantageous development, the slot antenna is inserted into the plug-in connector housing in an interlocking manner or is attached to the plug-in connector housing in an interlocking manner.

In an advantageous embodiment, specific information such as contact information, pin assignments and installation instructions may be stored in the RFID chip and read by the RFID reader.

What is of particular advantage here is that, compared with labelling, a large amount of information may be provided.

In a further embodiment, an antenna body in the form of a metal foil, in particular a self-adhesive copper foil, is positively bonded into the plug-in connector. The advantage of this is that an already existing plug-in connector housing can be manually retrofitted.

In a preferred embodiment, a metal foil is injected directly into the housing of the plug-in connector as an insertion component. To this end, the metal foil is inserted into the injection moulding tool during the production process and is coated with a plastic in a subsequent working step. The advantage of this is that the production process can be automated, which results in lower production costs for large quantities.

In a further preferred embodiment, the slot antenna can be produced using an MID (Moulded Interconnect Device) method. In particular, the slot antenna can be produced by means of a preferably local coating using a lacquer suitable for an LDS (Laser Direct Structuring) method and corresponding laser activation as well as the associated etching and coating methods.

In another embodiment, the RFID transponder, and in particular the slot antenna thereof, is designed as a fixed assembly part that can be positively inserted into the plug-in connector housing. The fastening of the RFID transponder can then be carried out by means of a latching facility, for example by means of yieldable locking catches on the plug-in connector housing as well as corresponding recesses on the slot antenna. Alternatively, also so-called "clips" can be integrated into the plug-in connector housing, which are used to detachably fasten the RFID transponder.

The plug-in connector housing can also include a pocket, into which the RFID transponder can at least partially be inserted and by means of which it can be fixed.

This has the advantage that RFID chips of different sizes with different memory sizes can be used and can, according to requirements, be fixed accordingly.

In an advantageous embodiment, the RFID tag additionally includes a coupling loop for magnetically coupling the RFID chip with the slot antenna.

In a further preferred embodiment, the plug-in connector housing comprises an associated so-called "module frame" that can be inserted therein, which module frame is usually characterised in that a large number of different so-called "plug-in connector modules" can be inserted therein. The RFID tag can be fastened in or on this module frame. The RFID tag can be fastened by means of clips, particularly if it is an RFID tag that is designed on the basis of a printed circuit board, i.e. it includes a printed circuit board on which the RFID chip and a coupling loop, for example in the form of a closed circuit path, are located. The coupling loop may be located on a first side of the printed circuit board and the RFID chip may be located on the second side of this printed circuit board. However, the chip and the coupling loop may alternatively also be placed together on one side of the printed circuit board. The lug may be made from a flexible material or may at least be flexibly fastened to the modular frame. The advantage of this is that the RFID tag is pushed against the slot antenna and, if necessary, is mounted with its coupling loop directly to the slot.

During manufacturing, the RFID tag can be glued onto the module frame, in particular onto a lug of the module frame, in the form of a foil into which the circuit path is integrated. This allows for manual processing of individual module frames, so that low quantities can be produced at low costs.

For larger quantities it is expedient to attach the circuit loop to the module frame, for example to the associated lug using MID technology, in particular the LDS method.

It is of particular advantage to attach the RFID tag to the module frame because the RFID tag can be replaced by replacing the module frame also in the case of permanently installed plug-in connectors. The replaceability of the module frame already automatically ensures the replaceability of the RFID transponder or the possibility of retrofitting existing plug-in connectors. In particular, this also applies to the use in already permanently installed systems, i.e. for plug-in connectors which already have cables permanently attached to them, and which in large switching installations are often present in large quantities, where the running operation must not be interrupted or if so only for a short period of time.

The attachment of the RFID tag to the module frame is further of particular advantage because the RFID tag, as a result of the fixed end position of the module frame in the plug-in connector housing, is automatically located in a specified position relative to the slot antenna and in particular relative to the slot thereof.

This position is for example specified as a result of measurements carried out as early as prior to the manufacturing of the module frame in relation to the electric and/or magnetic coupling of the RFID tag to the slot antenna and corresponding optimisations of this position. The position specified in this way is realised by fixing the lug to the module frame. In this context, the lug can be integrally designed with the module frame, may be permanently connected therewith, e.g. glued, or may be detachably fixed thereto.

EMBODIMENT EXAMPLE

An embodiment example of the invention is shown in the drawing and will be explained in more detail below, wherein:

FIG. 1a and FIG. 1b represent a plug-in connector housing 1 with an RFID transponder 2 integrated therein.

Figure 1A:
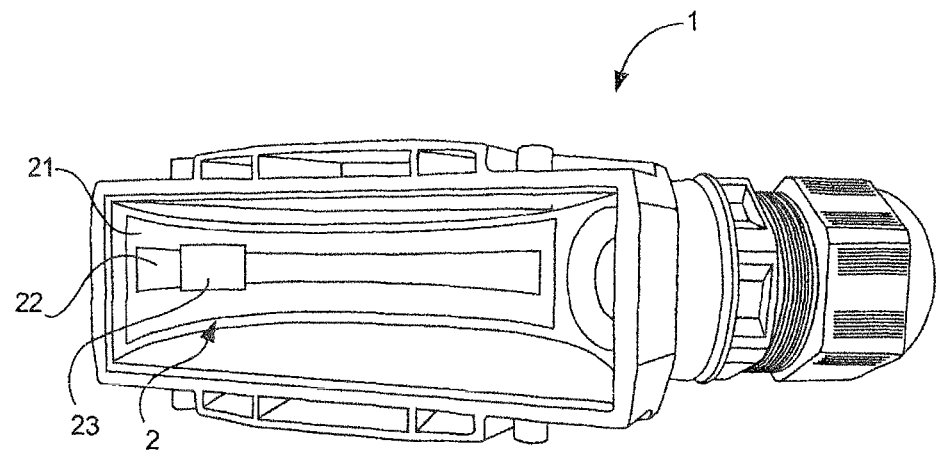
FIG. 1a shows a plug-in connector with an integrated RFID transponder in a 3D representation.
Figure 1B:
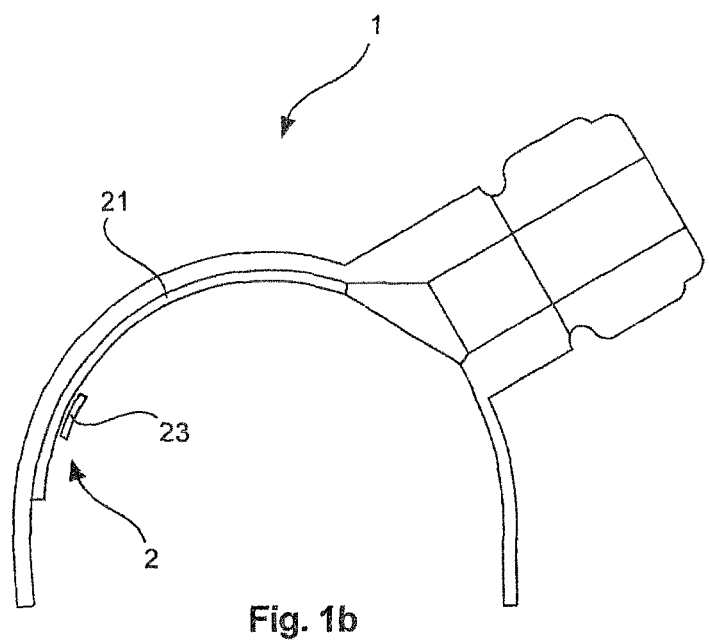
FIG. 1b shows the plug-in connector in a cross-sectional view.

The RFID transponder 2 comprises an antenna and an RFID tag 23, wherein the antenna comprises an antenna body 21 and a slot 22 provided therein, so that the antenna is a slot antenna.

The antenna body 21 consists of a metal foil, in particular a self-adhesive copper foil.

The RFID tag 23 is provided on the slot 22 of the slot antenna. To this end, the RFID tag 23 is fixed to the antenna body 21 and/or the plug-in connector housing 1 and is for example glued onto the antenna body 21, latched onto the plug-in connector housing 1 or fastened in any other way.

Figure 2A:
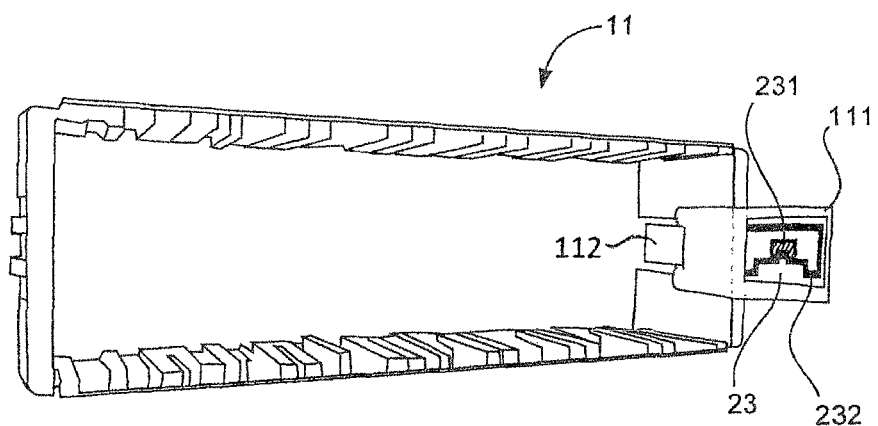
FIG. 2a shows a module frame with a flexible lug and an RFID tag with a coupling loop provided thereon.

FIG. 2a shows a module frame 11. The module frame 11 is modified for test purposes, i.e. has a fastening device, namely a land 112 formed by cutting out two slots. For test purposes, a flexible lug 111 consisting of a transparent material is fastened to this land 112. On this lug 111, the RFID tag 23 is located. In this case, the RFID tag 23 comprises a flexible circuit board that is also made from a transparent material, e.g. a foil. The RFID chip 231 is fixed to the flexible circuit board and is connected in an electrically conductive manner to a coupling loop 232 located on the flexible circuit board, which is designed as a circuit path. In this connection, the RFID chip 231 and the coupling loop 232 are jointly located on one side of the flexible circuit board that is glued onto the lug 111. Due to the transparent material of the lug 111 and the transparent material of the flexible circuit board of the RFID tag 23, the RFID tag 23 with its coupling loop 232 and its RFID chip 231 can be seen in the drawing, although in the present case it is located on a side of the lug 111 that faces away from the viewing position.

Alternatively, the lug 111 could be formed as an MID component and the coupling loop 232 could be produced for example using the LDS method. The lug 111 could be made from a rigid material and could be permanently connected to the module frame 11, as a result of which any desired position of the RFID tag 23 relative to the slot 22 could be established. Also, the module frame 11 could be integrally formed together with the lug 111, which would constitute a manufacturing simplification.

As has already been mentioned above, the assembly shown here is a module frame 11 modified for test purposes. The flexible lug 111 can, as an alternative, be integrally designed together with the module frame 11 in a final series production of an assembly according to the invention, i.e. may be a fixed component of the module frame 11. Thus, the lug 111 may be made from the same plastic as the module frame 11.

Figure 2B:
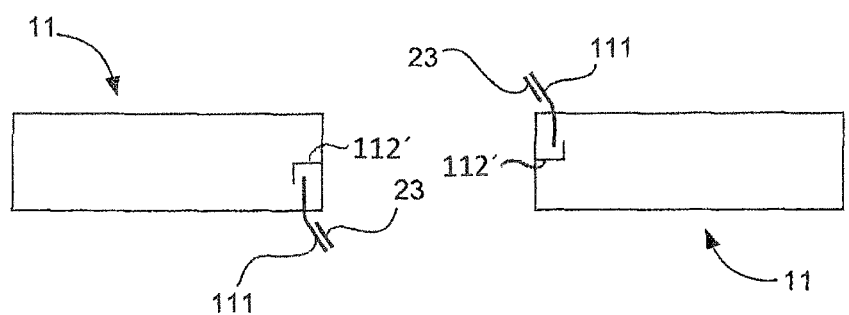
FIG. 2b shows the module frame in a schematic cross section.

FIG. 2b shows a schematic cross-sectional view of the module frame 11 with the flexible, transparent lug 111 and the RFID tag 23 in two different orientations. In this connection, the lug 111 is at least partially held in an interlocking and force-fitted manner to an alternative fastening device of the module frame 11, for example a pocket or a clamp 112'.

Figure 3A:
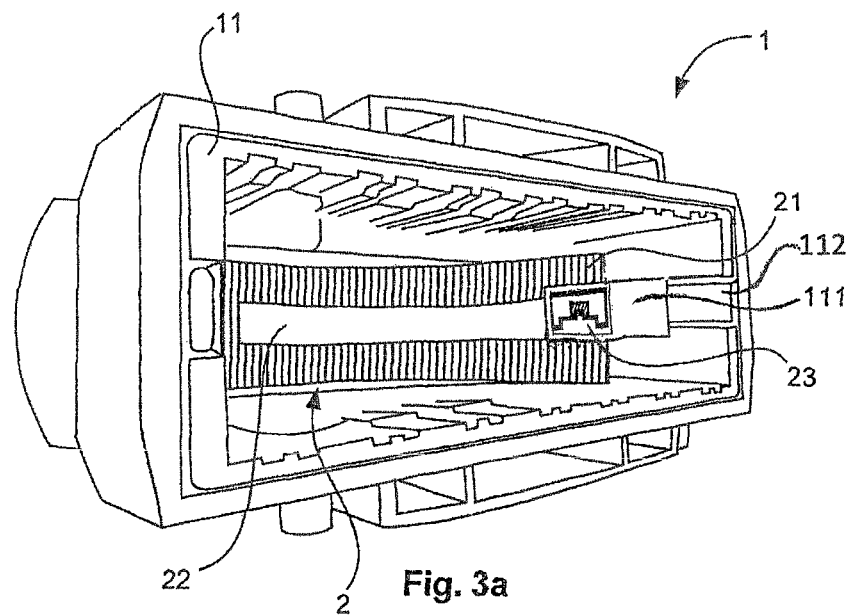
FIG. 3a shows a plug-in connector housing with the inserted module frame.
Figure 3B:
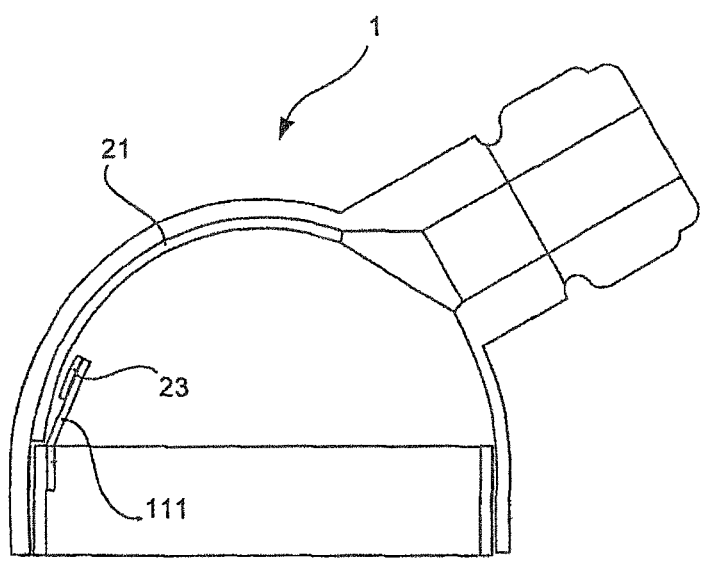
FIG. 3b shows the plug-in connector housing with the inserted module frame in a cross-sectional view.

In FIG. 3a, the plug-in connector housing 1 is equipped with the associated module frame 11. It can easily be seen that by inserting the module frame 11 into the plug-in connector housing 1, the lug 111 and thus the RFID tag 23 fixed thereon is automatically positioned in a specified position relative to the antenna body 21, in particular relative to the slot 22 located therein. In this arrangement, the RFID tag 23 is pushed by the pressing force of the flexible lug 111 directly against the antenna body 21. Due to the transparent material of the lug 111 and the transparent material of the flexible circuit board of the RFID tag 23, the RFID tag 23 can be seen with its coupling loop 232, its RFD chip 231 in the drawing, although it is located on the side of the lug 111 that faces away from the slot 22. Thus, the coupling loop 232 has a distance as small as possible from the slot 22 and is therefore fixed in a horizontal direction, i.e. in its distance from the slot 22. As a result of being fixed to the module frame 11, the lug 111 is further fixed also in its vertical direction, which ensures that the coupling loop 232 is located directly on the slot 22 and extends as closely as possible along the edges of the slot 22.

Alternatively, the RFID 23 may also be provided on the side of the lug 111 that faces away from the slot 22. As a result, when the lug 111 is pressed against the antenna body 21, it has a defined distance, namely the thickness of the lug 111, from the slot 22.

As a result of being attached to the module frame 11, the RFID tag 23 may on the one hand be provided in a replaceable manner on permanently installed plug-in connectors and may on the other hand be automatically located with its coupling loop 232 in a position relative to the slot 22 that is particularly advantageous for coupling.

This position that is particularly advantageous for coupling may be previously determined in corresponding measurements and can be taken into account during the manufacturing of the plug-in connector housing 1, in particular of the module frame 11, and the position of the lug 111 that can be moulded thereto during manufacturing.

LIST OF REFERENCE NUMERALS

A plug-in connector housing with an RFID transponder
1 Plug-in connector housing
11 Module frame
111 Lug
112 Land (fastening device)
112' Pocket/clamp (alternative fastening device)
2 RFID transponder
21 Antenna body
22 Slot
23 RFID tag
231 RFID chip
232 Coupling loop

The invention claimed is:

1. A plug-in connector housing comprising an antenna, wherein the antenna is provided in or on the plug-in connector housing, wherein the antenna comprises a slot antenna having a slot, wherein the plug-in connector housing includes a removable module frame, the removable module frame including an RFID transponder having an RFID tag with an RFID chip, and wherein the RFID tag is directly fixed to one of the removable module frame and a lug associated with the removable module frame, and
wherein the RFID tag is automatically located, as a result of the mounting of the removable module frame in the plug-in connector housing, in a specified position relative to the slot of the slot antenna.

2. The plug-in connector housing as claimed in claim 1, wherein the slot antenna is attached in an interlocking manner to the plug-in connector housing or is inserted into the plug-in connector housing.

3. The plug-in connector housing as claimed in claim 1, wherein the slot antenna has an antenna body that is implemented as a metal foil.

4. The plug-in connector housing as claimed in claim 3, wherein the metal foil is a self-adhesive copper foil.

5. The plug-in connector housing as claimed in claim 1, wherein the plug-in connector housing is an injection-molded part and in that the slot antenna is inserted as an insertion part into the plug-in connector housing and is coated with plastic.

6. The plug-in connector housing as claimed in claim 1, wherein the plug-in connector housing comprises an MID (Molded Interconnect Device) enabled plastic or is coated with an LDS (Laser Direct Structuring) enabled material or lacquer, and in that the slot antenna is produced using an MID method.

7. The plug-in connector housing as claimed in claim 6, wherein the slot antenna is produced using the LDS method.

8. The plug-in connector housing as claimed in claim 1, wherein the RFID transponder and in particular the antenna body thereof is implemented as a dimensionally stable assembly part that can be inserted into the plug-in connector housing in an interlocking manner and can be fixed therein.

9. The plug-in connector housing as claimed in claim 1, wherein specific information about the plug-in connector is stored in the RFID chip, which is read by an RFID reader.

10. The plug-in connector housing as claimed in claim 9, wherein the specific information is selected from the group consisting of contact information, pin assignment and installation instructions.

11. The plug-in connector housing as claimed in claim 1, wherein the RFID tag has a coupling loop for magnetically coupling the RFID chip with the slot antenna.

12. The plug-in connector housing as claimed in claim 1, wherein the RFID tag has a folded dipole for electrically coupling the RFID chip with the slot antenna.

13. The plug-in connector housing as claimed in claim 1, wherein the specified position relative to the slot further comprises the RFID tag located a thickness of the lug from the slot of the slot antenna.

14. The plug-in connector housing as claimed in claim 1, wherein the specified position relative to the slot further comprises placing the RFID tag on the slot.

* * * * *